May 29, 1956     J. C. BAREFOOT     2,747,748
BREAD CARRIER
Filed Oct. 19, 1953
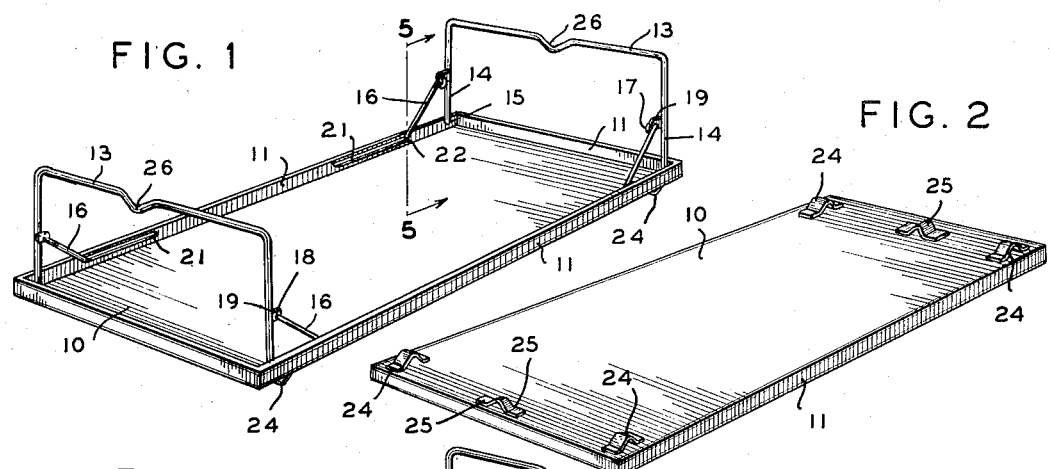
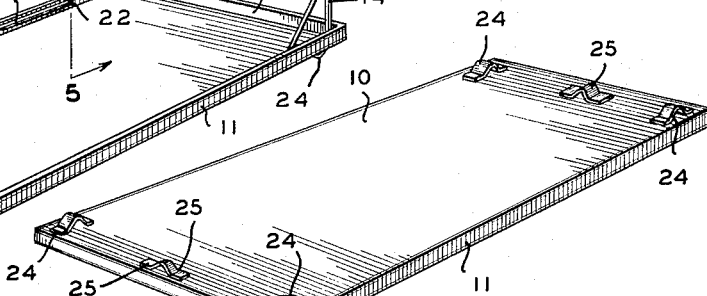
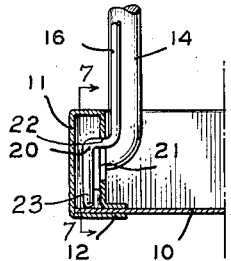
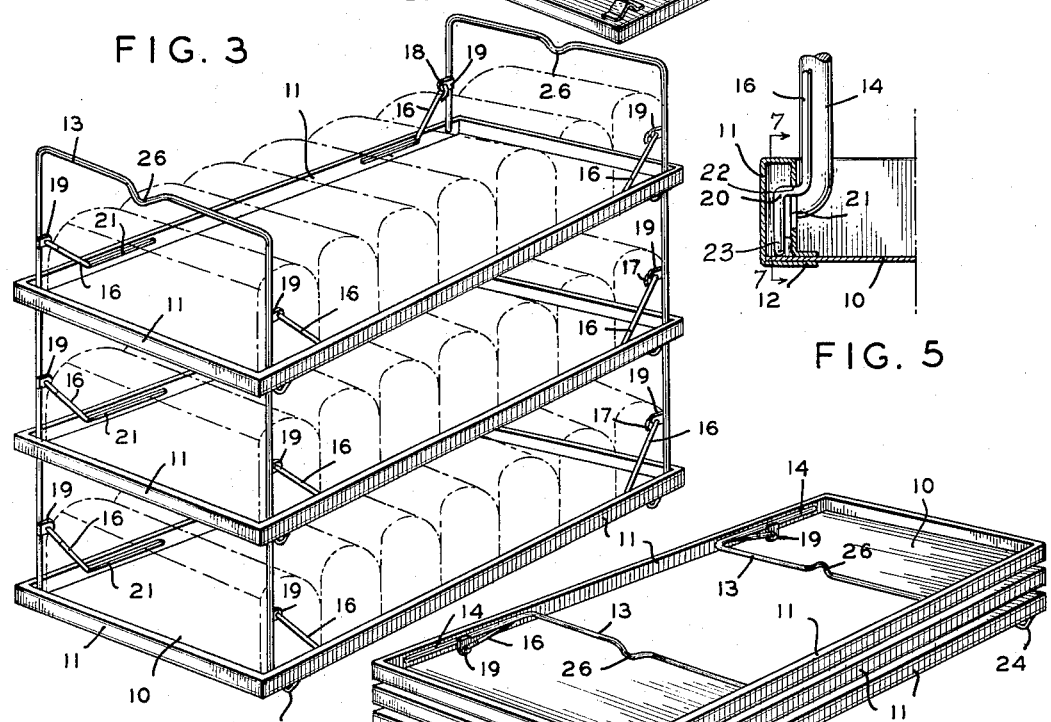
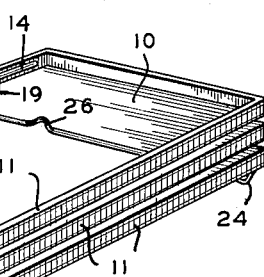
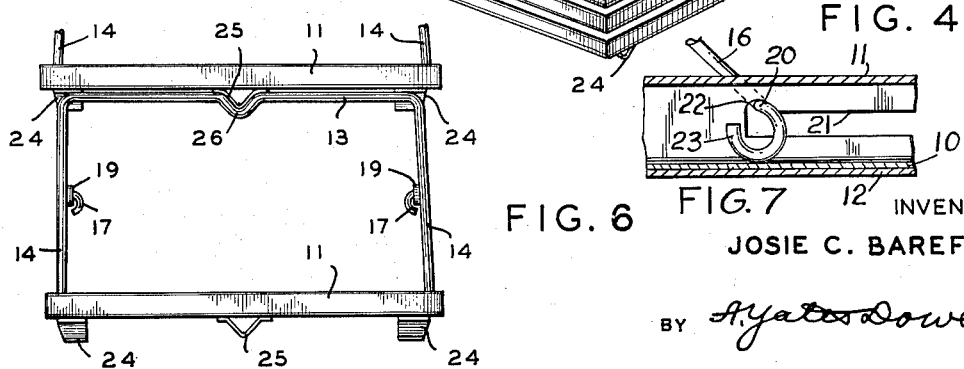
INVENTOR
JOSIE C. BAREFOOT
BY *A. Yates Dowell*
ATTORNEY

United States Patent Office 2,747,748
Patented May 29, 1956

2,747,748

BREAD CARRIER

Josie C. Barefoot, Charlotte, N. C.

Application October 19, 1953, Serial No. 386,683

4 Claims. (Cl. 211—126)

This invention relates to the movement of commodities both indoors and from one place to another, and more particularly to the production and handling of bread as well as other articles some of which are produced and delivered frequently, and including the delivery of the same to the customer.

The invention relates specifically to a collapsible tray, container or carrier particularly suitable for use in the handling and delivery of bread, and which can be used individually, can be stacked either when empty or when filled with bread, and can be collapsed and nested when empty.

Carriers of various kinds have been employed in the handling of bread in bakeries and in the delivery of loaves of bread, however they have not been satisfactory for various reasons including waste of space regardless of whether full or empty, their size, weight, difficulty in handling and storing, their lack in durability, and the fact that their cost was out of proportion to their value.

It is an object of the invention to provide a collapsible bread tray of simple, inexpensive, durable construction which is easy to manufacture and convenient to use, and by means of which the handling of bread is facilitated and time required for such handling is materially reduced.

Another object of the invention is to provide a collapsible bread carrier of particular value, not only in the handling of bread or other commodity, but by the use of which packaging and costs incident thereto will be greatly reduced, as well as a bread carrier or tray which can be stacked when filled and collapsed and nested when empty.

A further object of the invention is to provide a carrier or tray for bread or other articles so constructed that it can be easily picked up and used individually or placed in a stack, and when stacked the parts will cooperate to maintain the trays in the proper relation and which trays can be easily collapsed and nested when empty, as well as a tray or carrier by the use of one or more of which any desired number of loaves of bread may be delivered without the use of surplus trays.

A further object of the invention is to provide a relatively shallow tray having end members or handles which may be located in collapsed relation against the bodies of the trays or may be disposed in extended relation substantially at right angles to the trays and locked in such position forming a rigid structure and making it unnecessary to use corrugated cartons or other expensive structure which would increase the overall costs of operation.

Further objects and advantages of the invention will be apparent from the following description taken in conjunction with the accompanying drawings, wherein;

Fig. 1 is a perspective view illustrating one application of the invention;

Fig. 2, a bottom perspective;

Fig. 3, a perspective view of a stack of trays;

Fig. 4, a series of collapsed nested trays;

Fig. 5, a transverse section on the line 5—5 of Fig. 1;

Fig. 6, an end elevation of two trays in stacked relation; and

Fig. 7, a section taken on line 7—7 of Fig. 5.

Briefly stated the invention comprises a bread tray having a relatively thin flat body of lightweight material, an upstanding retaining rim about the same and a handle at each end which can be located in upright position for use as a handle or for supporting another bread tray, the structure permitting stacking of several trays when they are filled and the nesting of collapsed trays when they are empty.

On its underside the tray is provided with supporting legs which are relatively short and spaced inwardly of the edges of the tray so that they may be received within the confines of the rim of an adjacent tray when collapsed and nested therewith. The legs fit between and prevent the handles of an adjacent tray from collapsing when the trays are stacked thus providing the necessary longitudinal alignment.

An intermediate leg or projection is provided on the bottom adjacent each end of the tray and the corresponding handle is provided with a complementary receiving groove or bent portion to receive such leg and maintain lateral alignment of adjacent trays.

With continued reference to the drawings the invention comprises a bread tray having a relatively thin flat body 10 of lightweight material such as, for example, but not limited to, aluminum. The body has an upper supporting surface for bread or other articles and a hollow reinforcing rim 11 along its sides and ends for retaining the bread on a tray. The reinforcing rim is of a hollow L-shaped configuration formed of a single strip of metal and with the end portions of the rim secured by weld 12 or otherwise to the upper and lower surfaces of the body of the tray.

At each end the tray is provided with a U-shaped handle 13 having the free ends 14 of the legs of the U disposed in opposite directions and each journaled in an opening 15 in an inner wall of the rim 11 of the trays at the side of the same so that the handle can be collapsed within the confines of the rim and can be extended at substantially right angles to the tray for use as a handle or as a support for another tray.

The handles are of a height and size slightly greater than that of a loaf of bread so that the bread will not be crushed when a plurality of trays are stacked. When the tray is not in use it may be nested with other trays and occupy space corresponding substantially only to the thickness of the tray.

Means is provided for preventing the handles from swinging beyond a substantially vertical or upright position, such means being in the form of links 16 each having one end provided with an eye 17 pivoted within a receiving opening 18 in a bracket 19 on the intermediate portion of one of the legs of the handle, and having its other end provided with an outwardly turned portion 20 which is reciprocable in a slot 21 in the inner wall of the rim 11. At the outermost end of each of the slots 21 is provided a laterally disposed enlargement 22 of the slot to receive the outwardly turned portion or extension 20 of the link 16 to lock the latter in position.

In order to maintain the handle 13 in extended upright position the lateral extension 20 of the link 16 is connected to the upper end of the leg of a U-shaped pressure bearing member 23 which slides within the hollow walls of the rim 11 of the tray and this member is of a dimension so that the distance between extension 20 and the bight portion of the U-shaped member 23 is slightly greater than the distance between the upper edge of slot 21 and the supporting surface of the tray so that the link will be under slight stress as it moves longitudinally of the slot and will readily enter the lateral enlargement 22 at the outermost end of the slot and will offer resistance to the reverse movement of such lateral portion from such enlargement.

The tray is provided on its underside with four projections 24 which form legs for supporting the tray a slight distance above a supporting surface so that the tray may easily be picked up by hand or by a hand truck. These legs are disposed inwardly, one adjacent each corner of the tray, and the legs at each end of the tray are located inwardly of the transverse portion of the handle thus preventing the handle from being collapsed when the trays are in stacked relation and maintaining the trays in the proper longitudinal alignment.

In order to provide lateral alignment of the trays an additional leg or projection 25 is disposed midway between the legs or projections at each end on the underside of the tray and the connecting portion of the handle is provided with a complementary bend 26 so that the trays when stacked will be maintained in the proper lateral relation.

When the trays are empty and the handles are collapsed the trays may be nested due to the fact that the legs project from the tray a dstance equal to or slightly less than the thickness of the rims of the tray and they are received within such rims as shown in Fig. 4.

It will be readily understood from the foregoing that the present invention is a relatively simple lightweight tray having a relatively thin body with an upstanding rim along each margin and between the rims at the sides of the tray at each end of the same is mounted a member which can swing into compact relation adjacent the body of the tray or disposed outwardly therefrom. Also such members may be used in moving the tray but they serve the important function of a support for a superimposed tray.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A tray comprising a relatively thin flat body, an upstanding hollow rim around the margin of said body, said rim comprising a strip having spaced upright walls and inwardly turned lower extremities located one above and one beneath said body and fastened thereto, the upstanding wall adjacent each side of said tray having an opening adjacent each end of the same and a longitudinally disposed slot spaced from said end, a handle pivotally mounted at each end of said tray, said handle comprising a pair of legs having lateral projection journalled in the openings in said upstanding walls, a brace member pivoted to the intermediate portion of each of said legs and having its opposite end provided with a lateral extension journalled in one of said slots, and a U-shaped pressure member located within said walls and attached to the end of said lateral extension.

2. A tray comprising a relatively thin flat body, an upstanding hollow rim around the margin of said body, said rim having a slot in each side adjacent the end thereof, said rim comprising a strip having spaced upright walls and with inwardly turned lower extremities located one above and one beneath said body and fastened thereto, a handle pivotally mounted at each end of said tray, said handle comprising a pair of arms having lateral projection journalled in said rim adjacent each end thereof, a brace member pivoted to the intermediate portion of said arms and having its opposite end provided with a lateral extension journalled in said slot in said rim, and means to retain the lateral extension in the slot, said lateral extension and said retaining means being located between the upright walls of said rim.

3. A relatively shallow tray having a base and an upstanding rim, a handle pivotally mounted at each end of said tray, said handle comprising a cross member having legs at each end with oppositely disposed portions journalled between opposite portions of said rim so that said handle may swing from a collapsed position close to the body of the tray to an extended position substantially at right angles to the tray, and brace members pivoted to the intermediate portion of said legs the side portions of the rim each having an elongated slot with an upwardly extending enlargement at the outer end thereof, each brace having a lateral extension projecting through the slot and having a U-shaped pressure member integral therewith with the pressure member adapted to press against the supporting surface of the tray and maintain the lateral extension in the enlargement in the slot, said brace members serving to maintain said handles in substantially rigid extended position, a supporting projection on the underside of said body adjacent but inwardly of each corner of the same in a manner to be disposed between the handles of a similar tray when such handles are extended and the tray is placed thereupon and thereby maintain the trays in cooperative longitudinal relation, and cooperating means between the underside of the tray and each of said handles for maintaining the trays in the proper transverse relation.

4. A light-weight article carrier comprising a relatively thin flat rectangular body having a narrow upstanding rim around the periphery thereof, a U-shaped handle pivotally mounted at each end of the tray by means of an outwardly extending projection on each leg of each U-shaped handle extending into corresponding openings in the side portion of the rim of the tray adjacent the ends of the tray, a brace pivotally connected to each leg of each U-shaped member, the adjacent portion of each side portion of the rim having an elongated slot with an upwardly extending enlargement at the outer end thereof, each brace having a lateral extension projecting through the slot and having a U-shaped pressure member integral therewith with the pressure member adapted to press against the supporting surface of the tray and maintain the lateral extension in the enlargement in the slot, the bight portion of each U-shaped handle having an inwardly extending notch intermediate the legs thereof, a plurality of projections on the underside of the tray, one at each corner thereof for engagement with the inner side of the U-shaped handle of a tray therebelow and an additional projection at each end on the underside of the tray for engagement with the inwardly extending notch of the corresponding handle of the tray therebelow whereby the trays may be stacked, said trays being adapted to be collapsed and stacked in collapsed condition with the projections on the underside extending within the space defined by the rim of the tray therebeneath and with U-shaped handles lying within the confines of the rim.

References Cited in the file of this patent

UNITED STATES PATENTS

| | | |
|---|---|---|
| 244,809 | Kern | July 26, 1881 |
| 414,926 | Stuart | Nov. 12, 1889 |
| 1,770,574 | Ironside | July 15, 1930 |
| 2,029,746 | Tufts et al. | Feb. 4, 1936 |
| 2,148,439 | Crawford | Feb. 28, 1939 |
| 2,641,383 | Coursey | June 9, 1953 |